No. 12,673. REISSUED JULY 16, 1907.
E. E. LINFOOT.
MANIFOLD PAPER AND PROCESS OF PRODUCING SAME.
APPLICATION FILED MAY 20, 1907.
2 SHEETS—SHEET 1.
FIG. I.
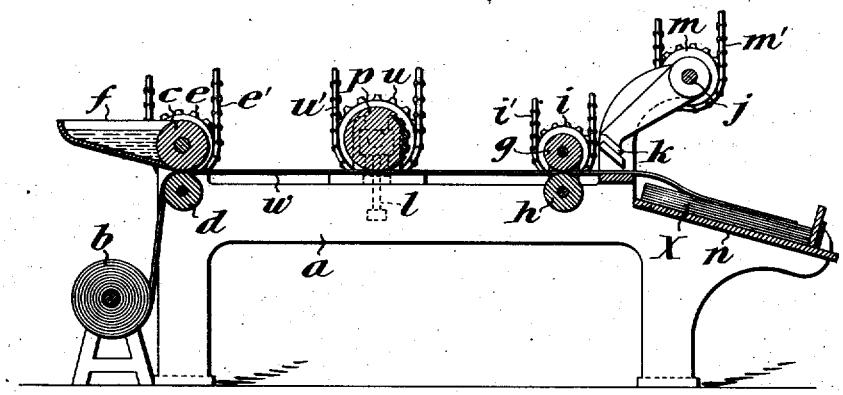
FIG. II.
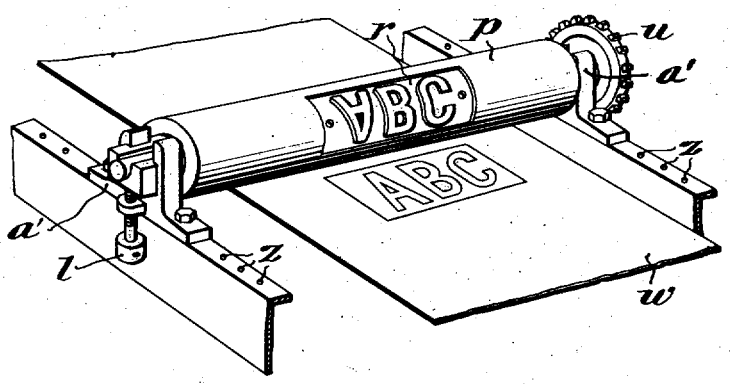
FIG. III.
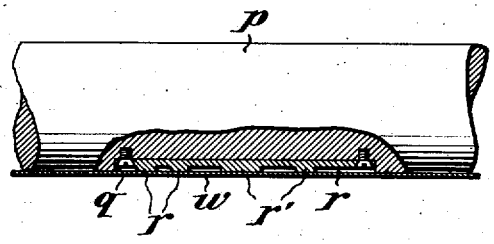
WITNESSES:
Clifton C. Hallowell
Thomas H. Kerr
INVENTOR:
ERNEST E. LINFOOT,
by Arthur E. Paige
Atty.

No. 12,673. REISSUED JULY 16, 1907.
E. E. LINFOOT.
MANIFOLD PAPER AND PROCESS OF PRODUCING SAME.
APPLICATION FILED MAY 20, 1907.
2 SHEETS—SHEET 2.
FIG. IV.
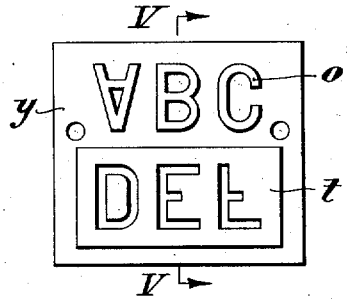
FIG. V.
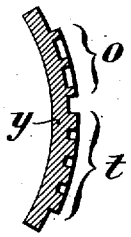
FIG. VI.
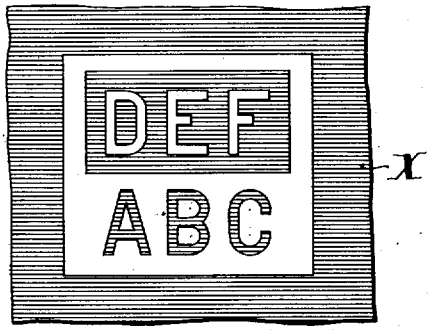
FIG. VII.
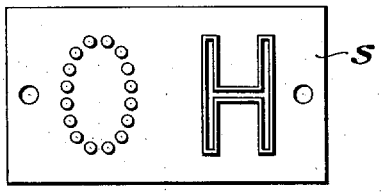
WITNESSES:
Clifton C. Hallowell
Thomas H. Kerr
INVENTOR:
ERNEST E. LINFOOT,
by Arthur C. Paige
Atty.

UNITED STATES PATENT OFFICE.

ERNEST E. LINFOOT, OF PHILADELPHIA, PENNSYLVANIA.

MANIFOLD-PAPER AND PROCESS OF PRODUCING SAME.

No. 12,673. Specification of Reissued Letters Patent. Reissued July 16, 1907.

Original No. 831,559, dated September 25, 1906, Serial No. 258,759. Application for reissue filed May 20, 1907. Serial No. 374,804.

*To all whom it may concern:*

Be it known that I, ERNEST E. LINFOOT, a citizen of the United States, residing at Philadelphia, in the county of Philadelphia and State of Pennsylvania, have invented certain new and useful Improvements in Manifold-Paper and Methods of Producing Same, of which the following is a specification.

It is the object of my invention to provide a manifold or impression sheet a color-coat of which shall bear any selected predetermined marking or brand, such as a name, letter, pattern, figure, trade-mark of any character, heraldic, or other device or emblem or symbol of any desired character, formed and completed in said coat, especially to so form the marking that it shall be distinguished from the adjacent portion of said coat by reason of being of a different appearance therefrom with respect to brightness of finish, and, furthermore, to provide a process by which the sheets provided with my marking may be produced with a minimum if any addition to the cost of producing unmarked sheets.

I now proceed to describe the best method known to me of marking the sheets in accordance with my invention and a machine by the aid of which such method may be practiced.

In the accompanying drawings, Figure I is a sectional elevation of an apparatus for the manufacture of the manifold or impression sheets in accordance with my preferred practice. Fig. II, is a view in perspective of a contact-roller and associated parts. Fig. III, is a view, partly in section, of a portion of the contact-roller, the crests of the type-like projections of the contact-plate being shown in contact with the paper. Fig. IV, is a face elevation of a contact-plate by which the marking shown in Fig. VI, is produced and which plate is of course to be mounted upon a roller or other device adapted to support it in operative relation to the sheet. Fig. V, is a vertical section of the last-mentioned contact-plate on the dotted line V, V, of Fig. IV. Fig. VI, is a view of a portion of a finished manifold or impression sheet, the impression or color coat face of which contains a group of letters. Fig. VII, is a view in front elevation of a contact-plate, illustrating varieties of type-like projections, in the use of which plate marking will be produced of letters of other than the solid block form.

Similar letters of reference indicate corresponding parts.

In the drawings, *a* designates a supporting-frame, and *b* a roll of suitable paper supported for rotation at one end thereof. Journaled on one end of the frame adjacent to the roll of paper *b* is a pair of rollers *c* and *d*, and journaled on the other end of the frame is another pair of rollers *g* and *h*. The rollers *c* and *d* are geared together, and they are actuated by a sprocket-chain *e'* engaging a sprocket-wheel *e* on the roller *c*, and the rollers *g* and *h* are geared together and are actuated by a sprocket-chain *i'* engaging a sprocket-wheel *i* on the roller *g*.

The paper web *w*, forming the backing for the ultimate impression or manifold sheets, is drawn from the roll *b* and between the pairs of rollers *c d* and *g h*, and during the passage of the web between the rollers *c* and *d* it receives the heated color-coat mixture from the roller *c*, the face of which passes through a suitable trough *f*, containing the heated color-coat mixture. The roller *c* receives the mixture, which is usually composed of carbon and other materials from the trough and spreads it upon the paper web *w* in the usual known manner.

The rotation of the pairs of rollers *c d* and *g h* occasions the continuous advance from left to right (with reference to Fig. 1) of the web from the roll *b*. The hot color-coat applied to the paper by the roller *c* gradually dries or sets during the time of its transit to the right-hand end of the machine, and by the action of a rotating cutter *k* the web is divided into sheets X of the required size, which are deposited within a suitable receiver *n*.

The cutter *k* is carried by a shaft *j*, which is journaled on the frame *a*. This shaft is provided with a sprocket-wheel *m*, which is engaged and driven by a sprocket-chain *m'*, the movement of the cutter *k* with relation to the movement of the paper web *w* being properly timed to sever from the latter the impression-sheets X of the required size.

Journaled in boxes carried by brackets *a'* on the frame *a* intermediate of the pairs of rollers *c d* and *g h* is a roller *p*, the face of which is in contact with the color-coat mixture spread upon the paper web *w*. This roller is provided with a suitable recess *q*, within which may be seated and secured by screws, as shown in Figs. II, and III, a contact-plate *r*, on which are formed type-like projections *r'*, corresponding to the desired marking.

In the arrangement of the parts illustrated in Figs. I, II, and III, the faces of the type-like projections are flush with the face of the roller *p*, and preferably said type-like projections and the face of the roller are, to produce the best finish on the color-coat, alike formed of metal. The roller *p* is provided with a sprocket-wheel *u*, around which passes a sprocket-chain *u'*, by means of which said roller is caused to rotate at such speed that its surface travels at the same rate as the speed of the web. The roller *p* and type-like projections thereon are, to produce the best results, of a different temperature from the color-coat upon the paper web *w* or colder relatively thereto, and during the operation of the apparatus the contact of the relatively cold roller *p* and type-like projections of the contact-plate with the color-coat of the paper while the color-coat is still in a pasty or unset condition renders the surface of the portion of the color face or coat with which such contact is made smoother than the regions of the sheet where such contact is not made, with the result that the body of the color-coat on the web and the letters "A B C" thereon will be of bright reflective finish, while the small region of the coat in which said letters appear will remain of duller finish. The portion of the web *w* which is shown in Fig. II bears as a marking on its color-coat the letters "A B C" in bright finish, which letters are located in a small panel of relatively dull finish, while the remainder of said coat is of a bright finish corresponding to that of said letters. The contact-roller *p* is preferably provided with devices, such as the set-screw *l*, by which its vertical position may be adjustably determined to present said roller in operative contact with the color-coat upon the paper web *w*. Said roller *p* may also be adjusted horizontally to different positions lengthwise of the machine and secured by engaging the securing-bolts for the brackets *a'* in selected bolt-holes *z* of the series shown in Fig. II, in the side bars of the frame *a*.

Many arrangements of contrasted bright and dull finished surfaces may be resorted to in producing desired marking. Thus, for example, in Fig. VI, on a sheet the body of which is of bright finish I illustrate a marking which includes the letters "D E F" in dull finish in a small region of bright finish. To produce this marking, I may employ in the roller *p* instead of the plate *r* (shown in Fig. II) the plate *y*. (Shown in Figs. IV and V.) The last-mentioned plate has type-like projections *o* like those of the plate *r* and has also a boss *t*, the face of which is flush with the faces of the type-like projections and that of the roller. In the face of said boss are cut depressions which correspond reversely with the letters "D E F" shown in Fig. VI. In the use of the contact-plate last referred to the projections *o* will produce the letters "A B C" in bright finish on the color-coat, and the face of the boss *t* will occasion the formation of a bright area thereon; but the region of the coat which comes beneath or registers with the depressed portion of the face of the boss *t* will remain of dull finish, with the result that the letters "D E F" will be produced in dull finish.

The varieties of marking in bright or dull effect which may be produced are many. Thus the plate *s* (shown in Fig. VII) has type-like projections of the letters "O" and "H," which will produce a marking in styles different from those shown in Figs. II and VI. The various color-coat mixtures which may be employed are not uniform in composition or consistency and in setting or drying qualities, and the distance that the contact-roller should be placed from the roller *c* to secure the best result will vary with the character of the mixture employed, and it is for this reason that I make the contact-roller adjustable within a certain range lengthwise of the machine, so that it may be adjusted to and secured in such position as to act upon any given color-coat mixture at the time when the latter is in such stage of its drying that the most effective marking action will take place.

It is to be understood that the process above described merely produces a different appearance in different regions of the surface of the impression-coating on the impression-sheet without impairing its uniform capacity for making impressions, the quantity of impression material per unit of area remaining uniform throughout the area of the sheet, as evidenced by its uniform opacity. However, in selected regions the surface of said coating is rendered denser or more compact, and consequently smoother and more reflective, the greater degree of smoothness being manifested by a brighter or more lustrous appearance of the surface.

I claim:—

1. A carbon or transfer sheet having a portion only of its transfer material smoothed so as to produce a polished surface over such portion without depriving said smoothed portion of its capacity to transfer an impression, substantially as set forth.

2. A carbon or transfer sheet having a portion only of its transfer material smoothed by pressure so as to produce a polished surface over such portion, substantially as set forth.

3. A carbon or transfer sheet having a portion only of its transfer material smoothed by pressure and change of temperature, so as to produce a polished surface over such portion, substantially as set forth.

4. An impression-sheet of uniform opacity throughout its area, having its impression-coating of different thicknesses in different regions, substantially as set forth.

5. An impression-sheet of uniform opacity throughout its area, having its impression-coating of different density in different regions, substantially as set forth.

6. A carbon or transfer sheet having a portion only of its transfer material smoothed so as to produce a polished surface over such portion, the polished and unpolished portions of said transfer material being of uniform opacity without depriving said smoothed portion of its capacity to transfer an impression, substantially as set forth.

7. The process of providing a carbon or transfer sheet with contrasting surfaces in different regions, which consists in smoothing a portion only of its transfer material so as to produce a polished surface over such portion without depriving said smoothed portion of its capacity to transfer an impression, substantially as set forth.

8. The process of providing a carbon or transfer sheet with contrasting surfaces in different regions, which consists in smoothing by pressure a portion only of its transfer material so as to produce a polished surface over such portion, substantially as set forth.

9. The process of providing a carbon or transfer sheet with contrasting surfaces in different regions, which consists in smoothing by pressure and change of temperature, a portion only of its transfer material, so as to produce a polished surface over such portion, substantially as set forth.

10. The process of providing an impression-sheet with a predetermined marking, which consists in bringing into contact with the color-coat on a backing, while said coat is in a pasty or unset condition, a contact device of suitable form to produce the required marking.

11. The process of providing an impression-sheet with a predetermined marking, which consists in bringing into contact with the color-coat on a backing while said coat is in a pasty or unset condition, a contact device having a face of different temperature than said coat and of suitable form to produce the required marking.

12. The process of producing an impression-sheet having a predetermined marking thereon, which consists in applying coloring-matter to the backing, and in bringing into contact with said coloring-matter on said backing while said coloring-matter is in a pasty or unset condition, a contact device of a different temperature than the coloring-matter and of suitable form to produce the required marking.

13. The process of producing an impression-sheet having a predetermined letter or marking thereon, which consists in applying the coloring-matter in a heated condition to the backing, and in bringing into contact with the coloring-matter on said backing and before said coloring-matter has set, a contact device having a contact-face cooler than said coloring-matter and of suitable form to produce the required marking.

14. An impression-sheet having the surface of its impression-coating of different reflective capacity in different regions, all of said regions having equal capacity to transfer an impression, substantially as set forth.

15. An impression-sheet having the surface of its impression-coating of different reflective capacity in different regions, all of said regions being of equal opacity and having equal capacity to transfer an impression, substantially as set forth.

16. The process of providing an impression-sheet with contrasting surfaces in different regions, which consists in bringing into contact with the transferable coating on a backing, a marking device of different temperature than said coating, and of suitable form to produce the required marking, substantially as set forth.

17. An impression-sheet comprising a backing and an impression-coating on said backing having a significant marking confined to the material of said coating without destroying the transferring quality of said coating at the marking, substantially as set forth.

18. An impression-sheet comprising a backing and an impression-coating on said backing having a legible significant marking confined to the material of said coating such as a trade-mark, symbol, emblem or design; the entire surface of the marked and unmarked portions of the impression coating, being transferable, substantially as set forth.

19. An impression-sheet comprising a backing and an impression-coating on said backing having a clearly defined legible significant marking confined to the material of said coating such as a trade-mark, symbol, emblem or design; the entire surface of the marked and unmarked portions of the impression-coating being transferable, substantially as set forth.

In testimony whereof, I have hereunto signed my name, at Philadelphia, Pennsylvania, this 13th day of May, 1907.

ERNEST E. LINFOOT.

Witnesses:

ARTHUR E. PAIGE,
ANNA F. GETZFREAD.